United States Patent
Takahashi

(10) Patent No.: US 6,432,015 B1
(45) Date of Patent: Aug. 13, 2002

(54) CONTROL APPARATUS FOR AUTOMATIC TRANSMISSION OF VEHICLE

(75) Inventor: Tooru Takahashi, Tochigi-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 6 days.

(21) Appl. No.: 09/770,384

(22) Filed: Jan. 29, 2001

(30) Foreign Application Priority Data

Jan. 31, 2000 (JP) .................................. 2000-021928

(51) Int. Cl.[7] .............................................. F16H 61/12
(52) U.S. Cl. ...................................... 475/116; 475/131
(58) Field of Search .............................. 475/116, 119, 475/127, 128, 131; 477/906

(56) References Cited

U.S. PATENT DOCUMENTS 4,494,423 A * 1/1985 McCarthy et al. .......... 475/133
6,102,826 A * 8/2000 Takahashi et al. .......... 475/119
6,319,165 B1 * 11/2001 Itou et al. .................. 475/119
6,361,464 B1 * 3/2002 Yoneyama ................. 475/116

* cited by examiner

Primary Examiner—Charles A. Marmor
Assistant Examiner—Ankur Parekh
(74) Attorney, Agent, or Firm—Armstrong, Westerman & Hattori, LLP

(57) ABSTRACT

A changeover valve can be switched to a state in which a normally-open solenoid valve to normally control a control valve for a high speed transmission train controls a control valve for a low speed transmission train. An oil passage to switch the changeover valve this state is connected to an oil passage on an output side of the solenoid valve at a P or R position of a manual valve. When a system failure has occurred while a vehicle is running forward in the D, M position of the manual valve, the high-speed transmission train is established. At the time of the system failure, if the manual valve is switched to the R or P positions the changeover valve is switched to the above-described state. By then switching the manual valve to the D, M position, the low-speed transmission train is established.

1 Claim, 2 Drawing Sheets

| | HYDRAULIC ENGAGING ELEMENT | | | | | SOLENOID VALVE | | | | |
|---|---|---|---|---|---|---|---|---|---|---|
| | C1 | C2 | C3 | B1 | B2 | $7_1$ | $7_2$ | $7_3$ | $7_4$ | $7_5$ |
| 1ST SPEED | O | X | X | X | X(O) | ON | ON | ON | OFF | OFF (ON) |
| 2ND SPEED | O | X | X | O | X | ON | ON | ON | ON | OFF |
| 3RD SPEED | O | X | O | X | X | ON | ON | OFF | OFF | OFF |
| 4TH SPEED | O | O | X | X | X | ON | OFF | ON | OFF | OFF |
| 5TH SPEED | X | O | O | X | X | OFF | OFF | OFF | OFF | OFF |
| 6TH SPEED | X | O | X | O | X | OFF | OFF | ON | ON | OFF | form
CONTROL APPARATUS FOR AUTOMATIC TRANSMISSION OF VEHICLE

BACKGROUND OF THE INVENTION

1. Field of the Invention

The present invention relates to a control apparatus for an automatic transmission of a vehicle, the control apparatus having a plurality of solenoid valves controlled by an electronic control circuit to thereby perform speed changing of a plurality of speed transmission trains of a forward running range.

2. Description of Related Art

When a control apparatus for an automatic transmission of a vehicle is constituted into an electronically controlled type using solenoid valves, it becomes necessary to enable the vehicle to run at a predetermined transmission train even at the time of a system failure in order to secure a fail-safe function when the electric charging to all of the solenoid valves is stopped in a system failure due to damages to the wires or the like.

If the above-described predetermined transmission train is a low-speed transmission train, when the system failure has occurred while running at a high speed, a shock will occur by downshifting from a high-speed transmission train to a low-speed transmission train. As a solution, the transmission train to be established at the time of system failure is set to be a relatively high speed. However, since it becomes difficult for the vehicle to start only with the high-speed transmission train, it is desirable to enable to establish also a relatively low-speed transmission train.

There has hitherto been known the following in Japanese Published Unexamined Patent Application No. 88322/1995. Namely, in a control apparatus for an automatic transmission in which an automatic transmission range and a manual transmission range can be selected as a forward running range, there is provided a changeover valve which can selectively establish two speed transmission trains at the time of a system failure. In the automatic transmission range, the changeover valve is restricted by a line pressure to the position in which, between the above-described two speed transmission trains, a first speed transmission train on a high speed side can be established. When the manual transmission range is selected, the restriction of the changeover valve by the line pressure of the changeover valve is released by a manual valve which moves in an interlocked relationship with the range switching operation so that the changeover valve is switched to a position in which, between the above-described two speed transmission trains, a second speed transmission train on a low speed side can be established at the time of system failure. In this manner, at the time of system failure, in the automatic transmission range, the first speed transmission train is established and, in the manual transmission range, the second speed transmission train is established.

In the above-described conventional control apparatus, there is a disadvantage in that, when the system failure has occurred in the manual transmission range, shocks occur due to the downshifting to the second speed transmission train of a lower speed even when the vehicle is running at a high speed. Further, there is a necessity of switching the position of the manual valve between the automatic transmission range and the manual transmission range. As a result, there is a disadvantage in that the stroke of the manual valve becomes large.

In view of the above points, the present invention has an object of providing a control apparatus for an automatic transmission of a vehicle in which, even in case an automatic transmission range and a manual transmission range is capable of being selected as a forward running range, two speed transmission trains of a high speed and a low speed can be established at the time of a system failure in the forward running range without switching the position of the manual valve. Also, the downshifting to a low speed transmission train due to the system failure while running at a high speed can be prevented.

SUMMARY OF THE INVENTION

In order to attain the above and other objects, the present invention is a control apparatus for an automatic transmission of a vehicle, the control apparatus comprising: a plurality of solenoid valves controlled by an electronic control circuit to thereby perform speed changing of a plurality of speed transmission trains in a forward running range; and switching means for selectively establishing predetermined two speed transmission trains out of the plurality of speed transmission trains in the forward running range, at a time of system failure in which electric charging to all of the solenoid valves is stopped; wherein the switching means is constituted such that: at the time of the system failure while running in the forward running range, a first speed transmission train on a high speed side out of the two speed transmission trains is established; and that, when the switching means is switched to the forward running range after switching to a range which is incapable of being switched directly from the forward running range, a second speed transmission train on a low speed side out of the two speed transmission trains is established.

The present invention is also applicable to a control apparatus in which the automatic transmission range and the manual transmission range can be selected as the forward running range. When the system failure has occurred while running in the forward running range, a first speed transmission train of a high speed is established in both the automatic transmission range and in the manual transmission range. It is thus possible to prevent the occurrence of shocks by the downshifting to the second speed transmission train of a low speed. In addition, when the system has failed, if a switching is made to the forward running range after switching to a range that cannot be directly switched from the forward running range, the second speed transmission train of a low speed is established. Therefore, in order to establish the second speed transmission train, there is no need of switching the position of the manual valve between the automatic transmission range and the manual transmission range. Further, also when only the automatic transmission range is set as the forward running range, the first speed transmission train and the second speed transmission train can be established at the time of system failure.

The range selecting pattern of the automatic transmission is such that the parking range, the reverse running range, the neutral range and the forward-running range are arranged in series in the order mentioned. The range that cannot be directly switched from the forward running range corresponds to the reverse running range and the parking range. Here, it is considered to arrange such that, at the time of the system failure, the second speed transmission train is established when a switching has been made to the forward running range after switching to the neutral range. However, since the neutral range is a range that can be directly switched from the forward running range, there is a possibility that the range is switched to the neutral range while the vehicle is running. In addition, in such an arrangement, when the system failure has occurred, the second speed transmission train is established by temporarily changing to the neutral range while running and then returning to the forward running range. Therefore, there cannot be eliminated the possibility of the second speed transmission train's being established while running at a high speed. On the other hand, according to the present invention, at the time of the system failure, the second speed transmission train cannot be established unless the vehicle is once stopped and the range is intentionally switched to the reverse running range or to the parking range and then is returned back to the forward running range. Therefore, there can be surely prevented the possibility that the second speed transmission train is established while the vehicle is running at a high speed.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figures 1, 3:
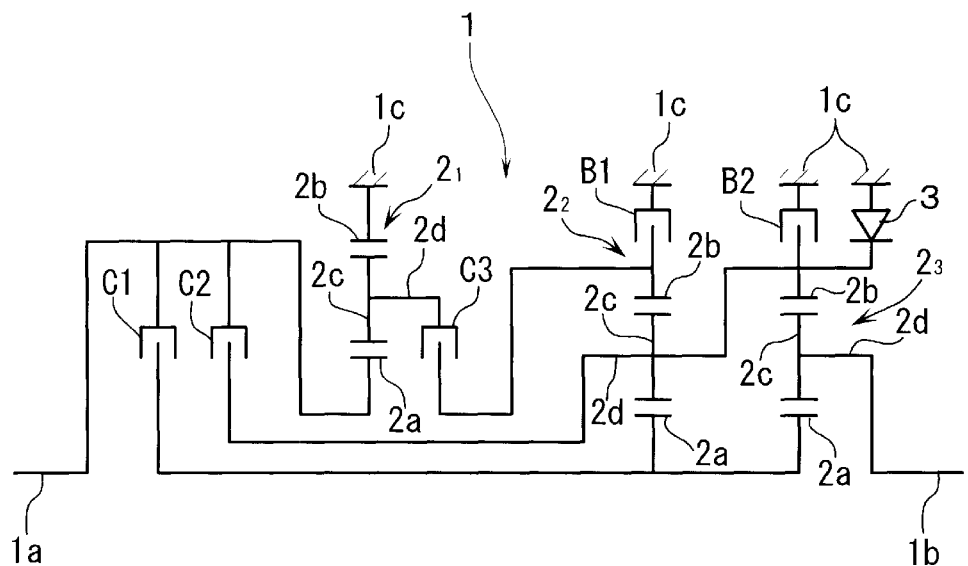
FIG. 1 is a skeleton diagram of an example of an automatic transmission to which the apparatus of the present invention is applied.
FIG. 3 is a table showing the state of engagement of hydraulic engaging elements and the state of electric charging at the time of establishment of each speed transmission train.

With reference to FIG. 1, numeral 1 denotes an automatic transmission for a vehicle such as a motor vehicle. This transmission 1 is constituted by a planetary gear type of transmission which is provided with: an input shaft 1a which is connected to an engine through a fluid torque converter (both not illustrated); an output shaft 1b which is connected to driving wheels of the vehicle through a differential gear (not illustrated); and first through third, i.e., a total of three, planetary gears $2_1$, $2_2$ and $2_3$ which are disposed between the input shaft 1a and the output shaft 1b. The transmission 1 is thus arranged to provide speed changing of six forward transmission trains and one reverse transmission train.

Each of the planetary gears $2_1$, $2_2$ and $2_3$ comprises a sun gear 2a, a ring gear 2b, a pinion 2c which engages with both the sun gear 2a and the ring gear 2b, and a carrier 2d which rotatably supports the pinion 2c. The sun gear 2a of the first planetary gear $2_1$ is connected to the input shaft 1a, and the carrier 2d of the third planetary gear $2_3$ is connected to the output shaft 1b. The ring gear 2b of the first planetary gear $2_1$ is connected to a casing 1c of the transmission 1 to prevent the ring gear 2b from rotating. The sun gears 2a, 2a of the second and third planetary gears $2_2$, $2_3$ are connected to each other. Further, the carrier 2d of the second planetary gear $2_2$ and the ring gear 2b of the third planetary gear $2_3$ are connected to each other. The ring gear 2b of the third planetary gear $2_3$ is connected to the casing 1c through a one-way clutch 3 which serves as a reaction force receiving member.

The transmission 1 is provided with the following members as hydraulic engaging elements: i.e., a first clutch C1 for connecting the input shaft 1a to the sun gears 2a, 2a of the second and third planetary gears $2_2$, $2_3$; a second clutch C2 for connecting the input shaft 1a to the carrier 2d of the second planetary gear $2_2$; a third clutch C3 for connecting the carrier 2d of the first planetary gear $2_1$ to the ring gear 2b of the second planetary gear $2_2$; a first brake B1 for connecting the ring gear 2b of the second planetary gear $2_2$ to the casing 1c; and a second brake B2 for connecting the ring gear 2b of the third planetary gear $2_3$ to the casing 1c.

According to the above-described arrangement, when the first clutch C1 and the second brake B2 are engaged, a 1st speed transmission train is established. When the first clutch C1 and the first brake B1 are engaged, a 2nd speed transmission train is established. When the first clutch C1 and the third clutch C3 are engaged, a 3rd speed transmission train is established. When the first clutch C1 and the second clutch C2 are engaged, a 4th speed transmission train is established. When the second clutch C2 and the third clutch C3 are engaged, a 5th speed transmission train is established. When the second clutch C2 and the first brake B1 are engaged, a 6th speed transmission train is established. When the third clutch C3 and the second brake B2 are engaged, the reverse transmission train is established. The 1st speed transmission train is established also when only the first clutch C1 is engaged. In this case, however, an overrunning of the output shaft 1b is allowed, so that engine braking does not work.

Figure 2:
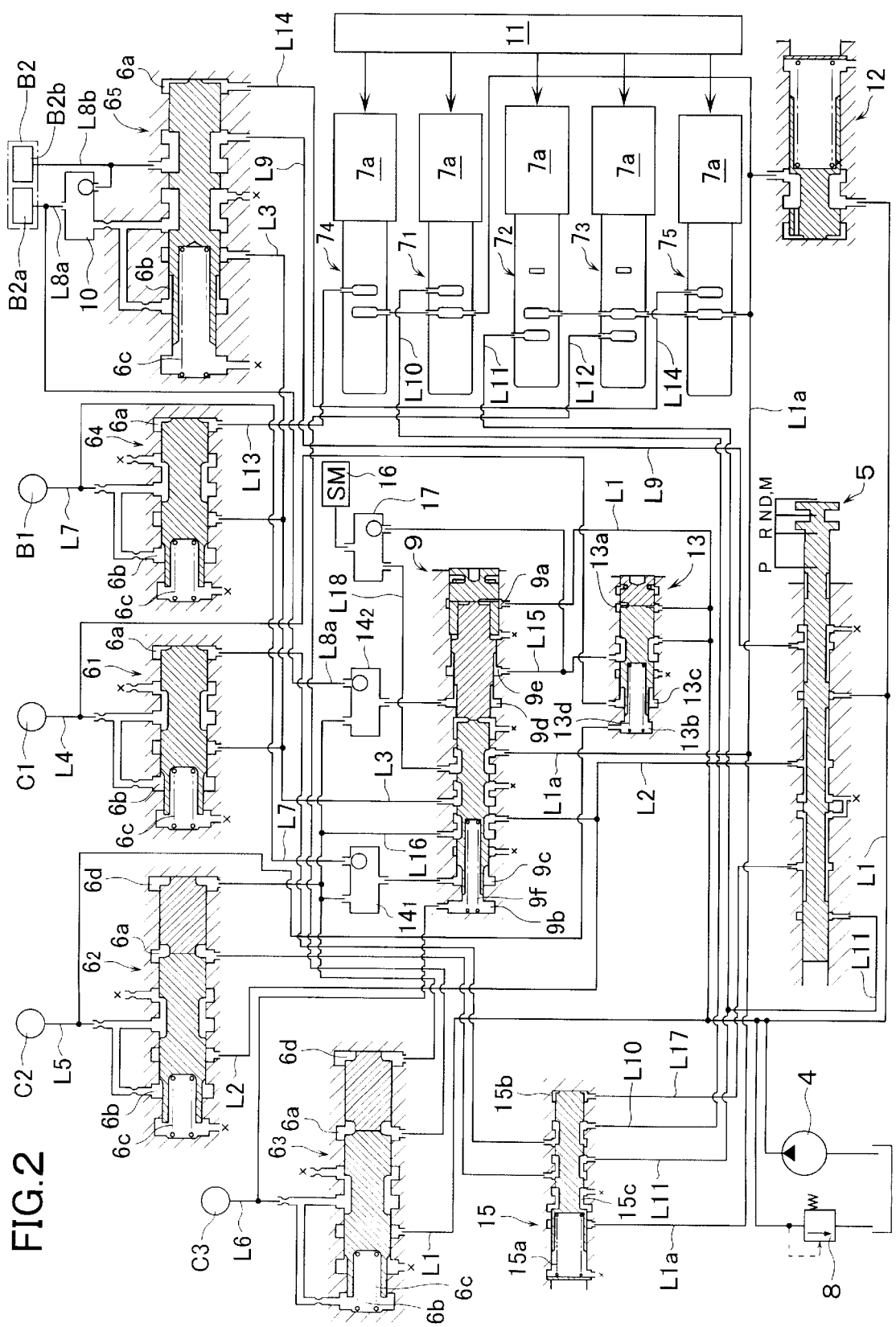
FIG. 2 is a hydraulic circuit diagram of one example of the apparatus of the present invention.

The operation of these clutches C1, C2 and C3 and the brakes B1 and B2 is controlled by a hydraulic circuit shown in FIG. 2. The hydraulic circuit is provided with: a hydraulic oil pressure source 4; a manual valve 5 which moves in a manner interlocked with a selector lever (not illustrated) which serves as an operating member to change over (or switch) the ranges (or positions); first through fifth, i.e., a total of five, speed-change control valves $6_1$–$6_5$ which independently control the oil supply to, and discharge from, each of the clutches C1, C2 and C3 and each of the brakes B1 and B2; and first through fifth, i.e., a total of five, speed-change solenoid valves $7_1$–$7_5$ which independently control each of the speed-change control valves $6_1$–$6_5$.

The manual valve 5 can be changed over or switched among a total of four positions in a manner interlocked with the operation of the selector lever, i.e., P position as a parking range position, R position as a reverse running range position, N position as a neutral range position (illustrated position), and D, M position as a forward running range position. The selector lever is constituted so as to be able to select, as ranges for forward running, automatic transmission (speed changing) range and a manual transmission range. In other words, when the selector lever is operated from the neutral range to the side opposite to the reverse running range, automatic transmission range is selected and, when the selector lever is operated from the above-described side to a lateral direction, manual transmission range is selected. On the other hand, the manual valve 5 stays in the same D, M position in either of the automatic transmission range and the manual transmission range. In the D, M position, an oil passage L1 which is communicated with the hydraulic oil pressure source 4 is connected to an oil passage L2. Pressurized oil regulated by a regulator 8 to a predetermined line pressure is supplied to the oil passage L2. The hydraulic oil is thus constantly supplied through the oil passage L2 to the second speed-change control valve $6_2$ for the second clutch C2. The hydraulic oil is also supplied, through an oil passage L3 which is connected to the oil passage L2 through a fail-safe valve 9 which is described in more detail hereinafter: to the first speed-change control valve $6_1$ for the first clutch C1; to the fourth speed-change control valve $6_4$ for the first brake B1; and to the fifth speed-change control valve $6_5$ for the second brake B2. To the third speed-change control valve $6_3$ for the third clutch C3, the hydraulic oil is constantly supplied through the oil passage L1 irrespective of the manual valve 5.

The hydraulic engaging elements which are made up of the first through third clutches C1, C2, C3 and the first brake B1 are respectively connected to each of the first through fourth speed-change control valves $6_1$, $6_2$, $6_3$, $6_4$ through each of the oil passages L4, L5, L6, L7 which are connected to the respective hydraulic engaging elements. The second brake B2 is provided with a pair of first and second actuators B2a, B2b. Both the actuators B2a, B2b are connected to a fifth speed-change control valve $6_5$ through oil passages L8a, L8b which are respectively connected to the actuators B2a, B2b. The oil passage L8b is connected to the oil passage L8a through a shuttle valve 10. To an input (inflow) side of the fifth speed-change control valve $6_5$, there is connected, aside from the oil passage L3, an oil passage L9 which is connected to the oil passage L1 in the R position of the manual valve 5. In the D, M position of the manual valve 5, the hydraulic oil can thus be supplied from the oil passage L3 to the first actuator B2a through the oil passage L8a. Further, in the R position of the manual valve 5, the hydraulic oil can be supplied from the oil passage L9 to the second actuator B2b through the oil passage L8b and also to the first actuator B2a through the shuttle valve 10.

Each of the speed-change control valves $6_1$–$6_5$ is provided with: an oil chamber 6a which forces each of the speed-change control valves $6_1$–$6_5$ toward the leftward oil supply position; an oil chamber 6b which forces each of the speed-change control valves $6_1$–$6_5$ toward the rightward oil discharge position (illustrated position); and a spring 6c which urges each of the speed-change control valves $6_1$–$6_5$ toward the oil discharge position. A signal pressure from each of the solenoid valves $7_1$–$7_5$ is inputted into the oil chamber 6a of each of the corresponding speed-change control valves $6_1$–$6_5$ through each of oil passages L10–L14 which are communicated with each of the solenoid valves $7_1$–$7_5$. Hydraulic oil pressure on the downstream side of each of the speed-change control valves $6_1$–$6_5$ is inputted into the oil chamber 6b of each of the speed-change control valves $6_1$–$6_5$. It is thus so arranged that the hydraulic oil pressure on the downstream side of each of the speed-change control valves $6_1$–$6_5$, i.e., the hydraulic oil pressure in each of the hydraulic engaging elements C1, C2, C3, B1, B2, can be regulated depending on the signal pressure from each of the solenoid valves $7_1$–$7_5$. The fifth speed-change control valve $6_5$ is constituted as follows. Namely, on the leftward oil supply position, the oil passage L8a is connected to the oil passage L3 and, on the rightward oil discharge position, the oil passage L8b is connected to the oil passage L9. In the reverse running range (i.e., in the R position of the manual valve 5), the output pressure of the fifth solenoid valve $7_5$ is made to zero (atmospheric pressure). The fifth speed-change control valve $6_5$ is switched to the oil discharge position. The hydraulic oil is thus supplied to both the actuators B2a, B2b of the second brake B2, so that the second brake B2 is thus engaged with a strong force. As a result of the engagement of the third clutch C3 by the hydraulic oil supply from the third speed-change control valve $6_3$, the reverse transmission train is established.

Each of the solenoid valves $7_1$–$7_5$ is constituted by a linear solenoid valve which outputs a signal pressure depending on the value of electric current charged to a solenoid 7a thereof. The electric charging to the solenoid 7a of each of the solenoid valves $7_1$–$7_5$ is controlled by an electronic control circuit 11 which is made up of a vehicle-mounted computer. Modulator pressure (a certain pressure which is lower than the line pressure) from a modulator valve 12 which is connected to the oil passage L1 is inputted into each of the solenoid valves $7_1$–$7_5$. The signal pressure to be outputted at the fully opened condition of the modulator valve 12 becomes the modulator pressure.

In the D, M position of the manual valve 5, it becomes possible to supply the hydraulic oil to all of the speed-change control valves $6_1$–$6_5$. When the signal pressures from the first and fifth solenoid valves $7_1$, $7_5$ are made high, the hydraulic oil is supplied to the first clutch C1 and the second brake B2 through the first and fifth speed-change control valves $6_1$, $6_5$, whereby the 1st speed transmission train is established. When the signal pressures from the first and fourth solenoid valves $7_1$, $7_4$ are made high, the hydraulic oil is supplied to the first clutch C1 and the first brake B1 through the first and fourth speed-change control valves $6_1$, $6_4$, whereby the 2nd speed transmission train is established. When the signal pressures from the first and third solenoid valves $7_1$, $7_3$ are made high, the hydraulic oil is supplied to the first clutch C1 and the third clutch C3 through the first and third speed-change control valves $6_1$, $6_3$, whereby the 3rd speed transmission train is established. When the signal pressures from the first and second solenoid valves $7_1$, $7_2$ are made high, the hydraulic oil is supplied to the first clutch C1 and the second clutch C2 through the first and second speed-change control valves $6_1$, $6_2$, whereby the 4th speed transmission train is established. When the signal pressures from the second and third solenoid valves $7_2$, $7_3$ are made high, the hydraulic oil is supplied to the second clutch C2 and the third clutch C3 through the second and third speed-change control valves $6_2$, $6_3$, whereby the 5th speed transmission train is established. When the signal pressures from the second and fourth solenoid valves $7_2$, $7_4$ are made high, the hydraulic oil is supplied to the second clutch C2 and the first brake B1 through the second and fourth speed-change control valves $6_2$, $6_4$, whereby the 6th speed transmission train is established.

Further, when the automatic transmission range is selected as the forward running range, each of the solenoid valves $7_1$–$7_5$ is controlled by the electronic control circuit 11 depending on the running conditions of the vehicle to thereby provide an automatic speed changing of 1st speed through the 6th speed. When the manual transmission range is selected, each of the solenoid valves $7_1$–$7_5$ is controlled by the operation of an upshift switch and a downshift switch (both not illustrated) through the electronic control circuit 11. Upshifting or downshifting is thus provided whenever the upshift switch or the downshift switch is switched on. In addition, at the time of speed changing, the pressure increase in a hydraulic engaging element to be engaged from now on (i.e., an on-coming hydraulic engaging element) and the pressure decrease in a hydraulic engaging element which has now been engaged but which is to be disengaged from now on (i.e., an off-going hydraulic engaging element) are appropriately controlled by the corresponding solenoid valves so that speed-change shocks do not occur.

Here, the first, fourth, and fifth solenoid valves $7_1$, $7_4$, $7_5$ are constituted into a normally-closed type, and the second and third solenoid valves $7_2$, $7_3$ are constituted into a normally-open type. The state of energizing or de-energizing of the solenoid 7a of each of the solenoid valves $7_1$–$7_5$ and the state of engagement or disengagement of the hydraulic engaging elements C1–C3, B1, B2 in the forward running range are shown in FIG. 3. In the figure, a mark "O" denotes that the hydraulic engaging element is engaged and a mark "X" denotes that the hydraulic engaging element is released (disengaged). In the automatic transmission range, the electric current is not charged to the fifth solenoid valve $7_5$ even at the time of the 1st speed, and the second brake B2 is kept disengaged. Only at the time of the manual transmission range, the fifth solenoid valve $7_5$ is charged with electric current. The hydraulic oil is supplied to the first actuator B2$a$ of the second brake B2 through the fifth speed-change control valve $6_5$. The second brake B2 is thus engaged and the 1st speed transmission train is established in a state in which the engine brake can be applied.

In case three or more hydraulic engaging elements are simultaneously engaged or in case the third clutch C3 and the first brake B1 are engaged even when two hydraulic engaging elements are simultaneously engaged, there occurs a so-called phenomenon of simultaneous engagement, whereby the transmission 1 becomes a locked state. Or else, in case the third clutch C3 and the second brake B2 are engaged while the vehicle is running forward, the reverse transmission train is established, whereby the transmission 1 and the engine are subjected to an undue force or load.

Therefore, in this embodiment, the first through fifth speed-change control valves $6_1$–$6_5$ are divided into the first group and the second group. The first group is made up, for example, of the second and third speed-change control valves $6_2$, $6_3$ which correspond to the second and third clutches C2, C3 for establishing the 5th speed transmission train. The second group is made up, for example, of the first, fourth, and fifth speed-change control valves $6_1$, $6_4$, $6_5$ which correspond to the remaining hydraulic engaging elements C1, B1, B2. The fail-safe valve 9 is interposed between the oil passage L3 which is communicated with the second group of speed-change control valves $6_1$, $6_4$, $6_5$ and the oil passage L2 which serves as an oil supply passage. At the time of failure in which a plurality of hydraulic engaging elements that should not be simultaneously engaged are simultaneously supplied with the hydraulic oil, the hydraulic oil supply to the second group of speed-change control valves $6_1$, $6_4$, $6_5$ is stopped, to thereby prevent the above-described problem.

The fail-safe valve 9 can be switched between the leftward open position in which the oil passage L2 is connected to the oil passage L3 and the rightward closed position (illustrated position) in which this connection is shut off. To an oil chamber 9$a$ on the right end of the fail-safe valve 9, the line pressure from the oil passage L1 is inputted, whereby the fail-safe valve 9 is forced toward the open position. In addition, the fail-safe valve 9 is provided with four oil chambers 9$b$, 9$c$, 9$d$, 9$e$ which force the fail-safe valve 9 toward the closed position. The hydraulic oil pressure from the third clutch C3 is inputted into the oil chamber 9$b$ through the oil passage L6. The hydraulic oil pressure from the first brake B1 is inputted into the oil chamber 9$c$ through the oil passage L7. The hydraulic oil pressure from the second brake B2 is inputted into the oil chamber 9$d$ through the oil passage L8$a$. The line pressure from the oil passage L1 is inputted into the oil chamber 9$e$ through a composite signal valve 13 which is described in more detail hereinafter. In addition, the fail-safe valve 9 is further urged toward the closed position by a spring 9$f$. When the hydraulic oil pressures to be inputted into any two of the oil chambers 9$b$, 9$c$, 9$d$, 9$e$ have exceeded a predetermined pressure, a combined force of the pushing force by these hydraulic oil pressures and the urging force by the spring 9$f$ exceed a pushing force by the line pressure which is inputted into the oil chamber 9$a$. As a result, the fail-safe valve 9 can be switched to the closed position. The composite signal valve 13 can be switched between the rightward open position (illustrated position) in which an oil passage L15 communicated with the oil chamber 9$e$ is connected to the oil passage L1, and the leftward closed position in which this connection is shut off. The line pressure from the oil passage L1 is inputted into a right end oil chamber 13$a$ of the composite signal valve 13 to thereby force this valve 13 toward the closed position. In addition, the composite signal valve 13 is provided with two oil chambers 13$b$, 13$c$ which force this valve 13 toward the open position. The hydraulic oil pressure of the second clutch C2 is inputted into the oil chamber 13$b$ through the oil passage L5, and the hydraulic oil pressure of the first clutch C1 is inputted into the oil chamber 13$c$ through the oil passage L4, respectively. Further, the composite signal valve 13 is urged toward the open position by a spring 13$d$. When a state has been attained in which both the first and second clutches C1, C2 are engaged (i.e., a state of 4th speed transmission train), the combined force of the pushing force by the hydraulic oil pressures to be inputted into the oil chambers 13$b$, 13$c$ and the urging force by the spring 13$d$ exceeds the pushing force by the line pressure to be inputted into the oil chamber 13$a$, whereby the composite signal valve 13 is switched to the open position.

In this manner, when both the first and second clutches C1, C2 are engaged, the line pressure is inputted into the oil chamber 9$e$ of the fail-safe valve 9. In this state, if the hydraulic oil is supplied to any one of the hydraulic engaging elements C3, B1, B2, the fail-safe valve 9 is switched to the closed position. Further, even in a state in which only one of the first and second clutches C1, C2 is engaged or in which both the clutches C1, C2 are disengaged and the line pressure is thus not inputted into the oil chamber 9$e$, if the hydraulic oil is supplied to two or more of the other hydraulic engaging elements C3, B1, B2, the fail-safe valve 9 is switched to the closed position. Then, as a result of the switching of the fail-safe valve 9 to the closed position, the connection between the oil passage L2 and the oil passage L3 is shut off. In the end, at the time of failure, the hydraulic oil supply to the second group of speed-change control valves $6_1$, $6_4$, $6_5$ is stopped and, consequently, the corresponding hydraulic engaging elements C1, B1, B2 are disengaged.

Further, there is provided an oil passage L16 which is connected to the oil passage L2 through the fail-safe valve 9 at the closed position of the fail-safe valve 9. The oil passage L7 which is communicated with the first brake B1, and the oil passage L16 are connected to the oil chamber 9$c$ of the fail-safe valve 9 through a shuttle valve $14_1$. The oil passage L8$a$ which is communicated with the second brake B2, and the oil passage L16 are connected to the oil chamber 9$d$ of the fail-safe valve 9 through a shuttle valve $14_2$. In this arrangement, once the fail-safe valve 9 has been switched to the closed position, the line pressure from the oil passage L2 is inputted into the oil chambers 9$c$, 9$d$ through the oil passage L16. Even if the hydraulic oil pressure in the corresponding hydraulic engaging elements C1, B1, B2 is lowered as a result of stopping of the hydraulic oil supply to the second group of speed-change control valves $6_1$, $6_4$, $6_5$, the fail-safe valve 9 is held or retained at the closed position, whereby the chattering of the fail-safe valve 9 can be prevented.

Even if the fail-safe valve 9 is switched to the closed position at the time of failure, the oil passage L2 and the oil passage L1, which serve as oil supply passages, remain connected respectively to the second speed-change control valve $6_2$ and the third speed-change control valve $6_3$ of the first group. Therefore, the 5th speed transmission train can be established by engaging the second clutch C2 and the third clutch C3. However, if the second speed-change control valve $6_2$ or the third speed-change control valve $6_3$ can no longer be switched to the oil supply position due to poor control of the second solenoid valve $7_2$ or the third solenoid valve $7_3$, i.e., if the high signal pressure can no longer be outputted from the second and third solenoid valves $7_2$, $7_3$ of normally-open type due to ON-failure (i.e., failure in which the solenoids are kept energized) of these solenoid valves $7_2$, $7_3$, the hydraulic oil can no longer be supplied to the second and third clutches C2, C3, with the result that the 5th speed transmission train cannot be established.

To cope with this kind of situation, in this embodiment, a second oil chamber 6d which forces the second and third speed-change control valves $6_2$, $6_3$ toward the oil supply position is provided in each of these valves $6_2$, $6_3$. The oil passage L16 is connected to these oil chambers 6d, 6d. At the closed position of the fail-safe valve 9, the line pressure from the oil passage L2 which serves as an oil supply passage is inputted into the oil chambers 6d, 6d through the oil passage L16. Each of the speed-change control valves $6_2$, $6_3$ is thus forcibly switched to, and held at, the oil supply position. In this manner, when the fail-safe valve 9 is switched to the closed position at the time of failure, the hydraulic oil is forcibly supplied to both the second and third clutches C2, C3, whereby the 5th speed transmission train is surely established. Alternatively, the following arrangement may also be employed. Namely, the input oil passage of the signal pressure of the solenoid valve and the oil passage L16 are connected to the oil chamber 6a of each of the second and third speed-change control valves $6_2$, $6_3$ through a shuttle valve. At the time of failure, the line pressure from the oil passage L2 is inputted into the oil chamber 6a through the oil passage L16 and the shuttle valve. Each of the speed-change control valves $6_2$, $6_3$ is thus switched to, and held at, the oil supply position.

In case the electric power supply to all of the solenoid valves $7_1$–$7_5$ is stopped as a result of system failure due, for example, to the breaking of electric wires or the like, only the signal pressures of both the second and third solenoid valves $7_2$, $7_3$ of normally-open type become high. The hydraulic oil is thus supplied to the second and third clutches C2, C3 through the second and third speed-change control valves $6_2$, $6_3$, whereby the 5th speed transmission train is established. However, with the 5th speed transmission train alone, it becomes difficult to start the vehicle to run or to drive the vehicle at a low speed. Therefore, at the time of system failure, it is desired to make it possible to establish, in the D, M position of the manual valve 5, a low-speed transmission train which is lower than the 5th speed transmission train, e.g., the 3rd speed transmission train. For that purpose, it becomes necessary to enable to engage the first clutch C1, in place of the second clutch C2, in the D, M position.

Therefore, in this embodiment, there is provided a changeover valve 15 which selectively connects an oil passage L11 communicated with the second solenoid valve $7_2$ to the oil chamber 6a of the second speed-change control valve $6_2$ and to the oil chamber 6a of the first speed-change control valve $6_1$. The changeover valve 15 can be switched between the following two positions, i.e.: a rightward first changeover position (illustrated position) in which the oil passage L10 communicated with the first solenoid valve $7_1$ and the oil passage L11 communicated with the second solenoid valve $7_2$ are respectively connected to the oil chamber 6a of the first speed-change control valve $6_1$ and to the oil chamber 6a of the second speed-change control valve $6_2$; and a leftward second changeover position in which these connections are shut off to thereby connect the oil passage L11 to the oil chamber 6a of the first speed-change control valve $6_1$. The changeover valve 15 is urged toward the first changeover position by a spring 15a. In addition, the changeover valve 15 is provided with a right end oil chamber 15b which forces the changeover valve 15 toward the second changeover position. To the oil chamber 15b, there is connected an oil passage L17 which is connected to the oil passage L11 in the R and P positions of the manual valve 5 and which is opened to the atmosphere in the N and D, M positions. The changeover valve 15 has formed therein an annular groove 15c which is connected, at the second changeover position, to the oil passage L1a on the downstream side of the modulator valve 12. The diameter of the land on the left side of this annular groove 15c is made larger than the diameter of the land on the right side. Once the changeover valve 15 is switched to the second changeover position, a leftward urging force due to the difference in the left and right land diameters is operated by means of the modulator pressure to be inputted from the oil passage L1a into the annular groove 15c. By this urging force, the second changeover valve 15 is held at the second changeover position against the urging force of the spring 15a.

In this arrangement, the changeover valve 15 is normally located at the first changeover position and, when a system failure has occurred while running in the forward running range, the 5th speed transmission train is established in both the automatic transmission range and in the manual transmission range. There can thus be prevented a disadvantage in that the downshifting to the 3rd speed transmission train takes place due to a system failure while running at a high speed, which system failure causing shocks to occur. At the time of the system failure, by switching the selector lever to the reverse running range or to the parking range to thereby switch the manual valve 5 to the R position or to the P position, a high signal pressure from the second solenoid valve $7_2$ is inputted into the oil chamber 15b of the changeover valve 15 through the oil passage L17. The changeover valve 15 is thus switched to the second changeover position and is thereafter held at the second changeover position. Therefore, at the time of the system failure, after switching the selector lever to the reverse running range or to the parking range, the manual valve 5 is switched to the D, M position. Then, the high signal pressure from the second solenoid valve $7_2$ is inputted into the oil chamber 6a of the first speed-change control valve $6_1$ through the changeover valve 15 which is in the second changeover position. The first speed-change control valve $6_1$ is thus switched to the oil supply position to engage the first clutch C1, whereby the 3rd speed transmission train is established.

In this embodiment, there is provided a detecting means for detecting a valve blocking of the fail-safe valve 9 due to contamination or the like. In more detail, there is provided an oil passage L18 which is connected to the oil passage L1a in the above-described closed position (illustrated position) of the fail-safe valve 9. A pressure switch 16 is connected to the oil passage L18. The fail-safe valve 9 will not be switched to the closed position in the D, M position of the manual valve 5 unless a failure has occurred. When the reverse transmission train is established by engaging the third clutch C3 and the second brake B2 in the R position, the fail-safe valve 9 is switched to the closed position by that hydraulic pressure of the third clutch C3 which is inputted into the oil chamber 9b and by that hydraulic pressure of the second brake B2 which is inputted into the oil chamber 9d. Therefore, if the pressure switch 16 is not switched on at the time of establishing the reverse transmission train, it can be judged that the fail-safe valve 9 is locked to the open position. In addition, the oil passage L15 on the output side of the composite signal valve 13 is connected to the oil passage L18 through a shuttle valve 17. At the time of establishment of the 4th speed transmission train, the composite signal valve 13 is switched to the open position by that hydraulic oil pressure of the second clutch C2 which is inputted into the oil chamber 13b and by that hydraulic oil pressure of the first clutch C1 which is inputted into the oil chamber 13c. The hydraulic oil pressure in the oil passage L15 becomes the line pressure and the pressure switch 16 should thus be switched on. Therefore, if the pressure switch 16 is not switched on at the time of establishment of the 4th speed transmission train, it can be judged either that the composite signal valve 13 is locked at the closed position or that the pressure switch 16 is in out of order.

An explanation has so far been made about the embodiment in which each of the control valves $6_1$ through $6_5$ which independently controls the supply of the hydraulic oil to, and discharge thereof from, each of the hydraulic engaging elements C1, C2, C3, B1, B2 is controlled by each of the solenoid valves $7_1$ through $7_5$. The present invention can similarly be applied to an embodiment in which a control is made of the hydraulic oil supply to, and discharge thereof from, the shift valve units which are made up of a 1–2 shift valve through a 5–6 shift valve, and in which these shift valves are controlled by a plurality of solenoid valves. For example, the following arrangement may be made. Namely, by the input of the high signal pressure from a solenoid valve of normally closed type, the 5–6 shift valve is switched to the 5th-speed position in which the 5th speed transmission train is established. Also, when a switching is made to the reverse-running range or to the parking range at the time of system failure, the signal pressure of the above-described solenoid valve is inputted into the 3–4 shift valve through a switching means like the above-described changeover valves 15. As a result, the 3–4 shift valve is switched to the 3rd-speed position in which the 3rd speed transmission train is established. Then, when a changing is made to the forward-running range, the 3rd speed transmission train is established. Furthermore, the present invention can also be applied not only to the above-described planetary gear type of automatic transmission but also to a parallel-two-shaft type of automatic transmission.

As can be seen from the above explanations, according to the present invention, there can surely be prevented shocks which occur by downshifting, while running at a high speed in the forward running range, to a lower speed of a second speed transmission train. Also, even if two positions of the manual valve are not provided for the forward running range, it is possible to establish a first speed transmission train of high speed and a second speed transmission train of low speed in the forward running range at the time of system failure. The stroke of the manual valve can thus be shortened to minimize the size of the manual valve.

It is readily apparent that the above-described hydraulic control apparatus for an automatic transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for an automatic transmission of a vehicle, said control apparatus comprising:

a plurality of solenoid valves controlled by an electronic control circuit to thereby perform speed changing of a plurality of speed transmission trains in a forward running range; and switching means for selectively establishing predetermined two speed transmission trains out of said plurality of speed transmission trains in the forward running range, at a time of system failure in which electric charging to all of said solenoid valves is stopped;

wherein said switching means is constituted such that: at the time of the system failure while running in the forward running range, a first speed transmission train on a high speed side out of said two speed transmission trains is established; and that, when said switching means is switched to the forward running range after switching to a range which is incapable of being switched directly from the forward running range, a second speed transmission train on a low speed side out of said two transmission trains is established.

* * * * *